United States Patent [19]
Dubois

[11] 4,014,579
[45] Mar. 29, 1977

[54] SPRING ACTUATED BRAKE CYLINDER WITH RELEASE PISTON LOCKOUT MEANS

[75] Inventor: Claude Jacque Dubois, Paris, France

[73] Assignee: WABCO Westinghouse GmbH, Freinville-Sevran, France

[22] Filed: Dec. 17, 1975

[21] Appl. No.: 641,596

[52] U.S. Cl. .................................. 303/3; 92/63; 188/170; 303/71; 303/89

[51] Int. Cl.² ...................................... B60T 13/22

[58] Field of Search .......... 188/170, 171, 173, 265; 303/2, 3, 71, 20, 15, 89; 92/5 L, 23, 63, 64, 130 A

[56] References Cited

UNITED STATES PATENTS

| | | | |
|---|---|---|---|
| 3,003,473 | 10/1961 | Ottoson | 92/5 L |
| 3,037,819 | 6/1962 | Sukala | 188/265 X |
| 3,182,566 | 5/1965 | Berg et al. | 92/130 A X |
| 3,482,666 | 12/1969 | Case et al. | 188/265 |
| 3,572,472 | 3/1971 | Black | 188/170 |
| 3,874,747 | 4/1975 | Case et al. | 188/265 X |

Primary Examiner—Trygve M. Blix
Assistant Examiner—Douglas C. Butler
Attorney, Agent, or Firm—R. S. Visk; R. W. McIntire, Jr.

[57] ABSTRACT

A brake cylinder device including a conventional release piston spring-biased toward a full-application or emergency application position and operable responsively to fluid pressure applied thereto in opposing relation to the spring force acting thereon, to a brake release position, a conventional service application piston, both pistons being subjectable concurrently to fluid pressure for operating the release piston to its release position and the service piston to a service brake application position in accordance with the degree of fluid pressure acting thereon, and a locking mechanism for automatically locking the release piston in its release position upon attainment of a full service application and thereafter during service braking operation at less than full service level and while the vehicle is in motion, and being operable for unlocking the release piston upon stopping of the vehicle and withdrawal of service braking fluid pressure.

10 Claims, 3 Drawing Figures

SPRING ACTUATED BRAKE CYLINDER WITH RELEASE PISTON LOCKOUT MEANS

BACKGROUND OF THE INVENTION

One type of presently known brake cylinders, as is known to those skilled in the art, is spring-actuated for effecting a brake application and is provided with a release piston subject to the force of a spring for effecting a full or emergency brake application and is subjectable to an opposing fluid pressure force for effecting a release of the brakes by counteracting the spring force. Fluid pressure must be continuously maintained against the release piston, however, in order to keep the brakes released while the vehicle is in motion. The brake cylinder in question is also provided with a service application piston arranged in opposing relation to the release piston so that when the opposing pressure areas of both pistons are concurrently subjected to the aforementioned fluid pressure, such pressure acting on the release piston causes said release piston to be operated to a brake release position, whereas pressure acting on the service piston effects a service application according to the degree of force differential between the opposing forces.

In this situation, however, the spring force acting on the release piston is constantly present, so that the degree of fluid pressure counteracting such spring force for operating the release piston to a release position and for effecting a service application must be of a sufficient degree as to compensate for the spring force.

SUMMARY OF THE INVENTION

The object of the present invention, therefore, is to provide a brake cylinder device of the spring-actuated type having a release piston characterized by a locking mechanism for locking and retaining said release piston in a release position during such time that the vehicle is in motion or that a service application is in effect at less than a full service level.

Briefly, the invention comprises a conventional spring-actuated brake cylinder having a release piston subjectable to fluid pressure in opposing relation to the spring force for effecting release of the brakes, a service application piston subjectable concurrently to the fluid pressure acting on the release piston, in opposing relation thereto, for effecting a service application of the brakes at a degree corresponding to the net or force differential between the opposing forces and acting in the same direction as that of the aforementioned spring force, and, according to the invention, a locking mechanism operable, upon movement of said release piston to a full release position, for locking said release piston in said release position during such time that a service application is in effect and until such time that the degree of service application, or the fluid pressure effecting said service application, attains a certain high degree, whereupon said release piston is automatically unlocked from said release position by control mechanism actuated by the operator and operable responsively to said fluid pressure at said certain high degree, so that when the application pressure is released or reduced to a certain low value, the spring force may take over in applying the brakes. Thus, during normal service braking or motion of the vehicle, the effect of the spring force is effectively neutralized until such time that the service application attains a degree equivalent to a full stop or emergency application. Thus, operating fluid pressure is conserved. The locking and unlocking mechanism is disposed within the brake cylinder in such manner as to require a minimum of space and be readily accessible for servicing.

DESCRIPTION AND OPERATION

Figure 1:
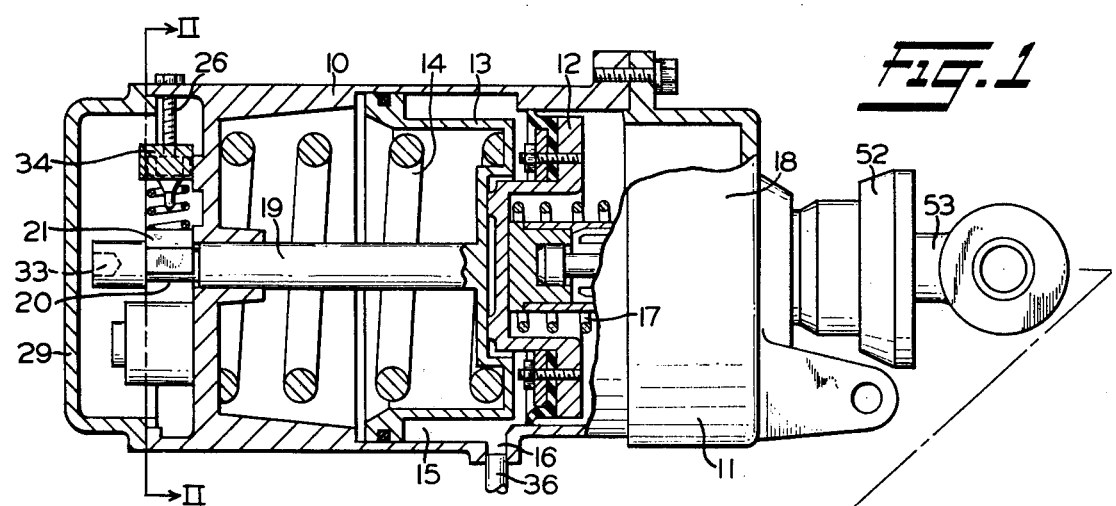
FIG. 1 is an elevational axial view, mostly in section, of a spring-actuated type brake cylinder device embodying the invention as connected in a vehicle brake system.

As shown in FIG. 1, a spring-actuated type brake cylinder device embodying the invention comprises a casing 10 and at the right-hand end thereof, as view in FIG. 1, a combination closure cover and mounting bracket 11.

Disposed within casing 10 is a service brake application piston 12 axially aligned with and in opposing relation to a release piston 13, the latter having a biasing spring 14 acting thereon in a direction for exerting a brake-applying force, transmitted through the service brake application piston and brake levers to the vehicle wheels, said levers and wheels being shown in simplified schematic arrangement in FIG. 1 of the drawing.

An operating pressure chamber 15 disposed in the brake cylinder device and having a port 16 opening thereto, is cooperatively defined by casing 10 and pistons 12 and 13. Chamber 15 may be either variably charged with or relieved of fluid pressure. Any prevailing pressure in chamber 15 exerts a force on release piston 13 in a brake release direction in opposition to spring 14 and a force on application piston 12 in a brake-applying direction opposite to said brake release direction and in opposition to a return spring 17 acting on said application piston.

An automatic slack adjuster 18 is disposed within closure cover 11 and is operatively connected to the piston rod of application piston 12. Since a detailed description of slack adjuster 18 is not deemed essential to an understanding of the invention, it suffices to note that said slack adjuster may be one of conventionally known type which functions, as is well known to those skilled in the art, to automatically adjust excessive clearance or space that may exist between the brake shoes and the braking surface of the wheel.

Figure 2:
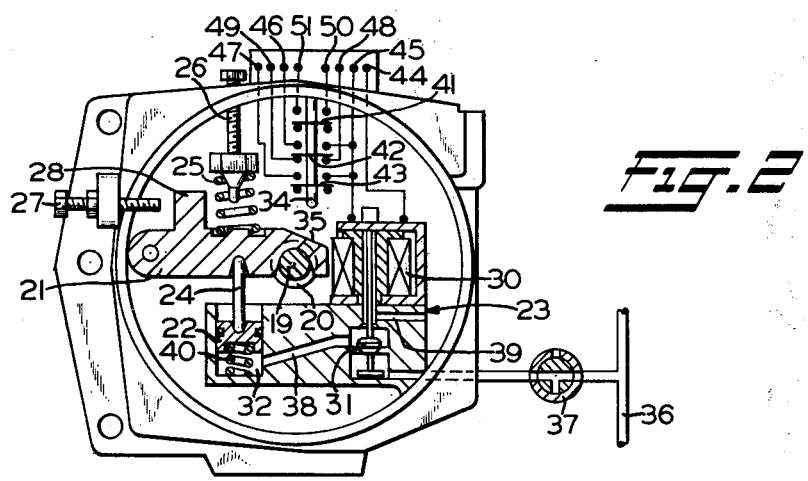
FIG. 2 is a sectional view, on the same scale as and taken along line II—II of FIG. 1, as viewed in the direction indicated by the arrows, showing locking mechanism of the device in a locked disposition.
Figure 3:
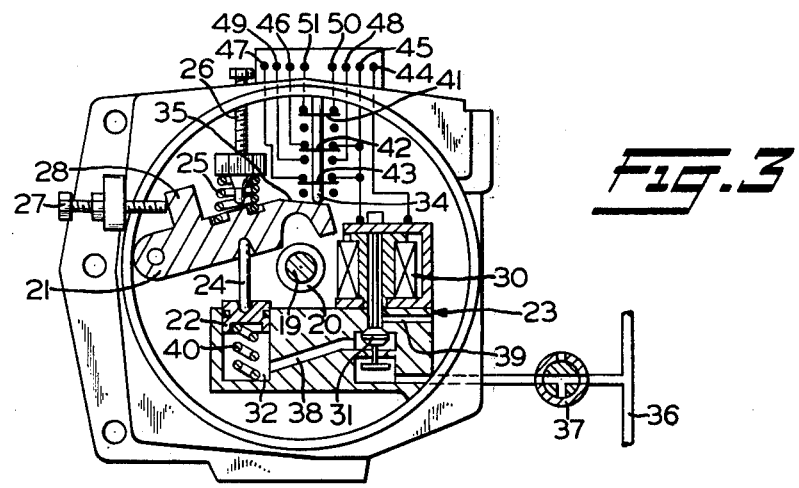
FIG. 3 is a sectional diagrammatic view, on the same scale as FIGS. 1 and 2, showing the locking mechanism shown in FIG. 2 but in an unlocked disposition.

Release piston 13 has a piston rod 19 extending coaxially from the side thereof opposite pressure chamber 15 and encircled by biasing spring 14. The free end of piston rod 19 extends axially through an end wall of casing 10 and terminates in a chamber formed externally on the end of said casing for housing a locking mechanism (as best seen in FIGS. 2 and 3). The free end of rod 19 has formed thereon an undercut groove or neck 20 which may accommodate a pivotable locking member 21 disposed transversely to said rod.

An unlocking piston 22, operably controlled by an electropneumatic valve device desingated generally by the reference numeral 23, is operatively connected to locking member 21 by a push rod 24, while a captive spring 25 acts on the locking member in a direction opposite to that of said push rod, the compression of said spring being adjustable by an appropriately disposed screw 26.

For expediency, in the event that brake release pressure cannot be supplied to a brake cylinder on a car connected in a train desired to be moved, release piston 13, once having been operated to its release position, in a manner to be hereinafter discussed, said piston may be securely locked in said release position until the deficiency can be corrected, by means such as a screw 27 positioned in the wall of casing 10 so as to be screwable from the outside of said casing up against a shoulder 28 formed on locking member 21. Means similar to screw 26 could also be provided in such manner as to be screwable into engagement with locking member 21, then releasing said locking member from its locked position if it is desired to apply an emergency brake when the vehicle is parked.

It should be noted that the compact arrangement of the locking mechanism in the chamber formed at the end of casing 10 by a removable access cover 29, requires very little space, such compactness being achieved by having the locking member 21, unlocking piston 22, a solenoid 30, and a valve member 31 with a fluted stem all disposed in a substantially common plane perpendicular to the axis of piston rod 19, said solenoid and valve member being part of the electropneumatic valve device 23. Removal of access cover 29 facilitates replacement or repair of defective parts of the locking mechanism without the necessity of dismounting the entire brake cylinder device. Moreover, the compact arrangement above noted permits supply passages via which an unlocking pressure chamber 32 adjacent the lower or pressure side of unlocking piston 22 is supplied with actuating pressure, to be held to a minimum length so as to reduce the loss of pressure and time of response.

If desired, means may be provided for manually operating release piston 13 to a release position in the event of fluid pressure failure and necessity to move the vehicle. Such means might comprise a screw device (not shown) including a screw member (not shown) insertable through cover 29 into a screw-threaded hole 33 formed in the free end of piston rod 19, whereupon said piston could be forcibly withdrawn to its release position.

A triple contact switch member 34 is shown in FIGS. 2 and 3 for closing and opening a plurality of electrical circuits to be described more fully hereinafter. Switch member 34, as viewed in FIG. 2, is shown in a lower or rest position, and is operable to an upper or indicating position, in which it is shown in FIG. 3, when engaged by a shoulder 35 of locking member 21 when said locking member is pivoted counterclockwise, as viewed in FIGS. 2 or 3, from a locking position (shown in FIG. 2) to an unlocking position (shown in FIG. 3).

As shown in FIG. 3 particularly, a source of fluid under pressure is represented by a pipe 36 which is connected at one end to port 16 and at the other end to a feed valve (not shown) by which fluid at a controlled pressure may be supplied to said pipe. A cut-off valve 37 is interposed in a passageway 38 connecting pipe 36 with unlocking pressure chamber 32, said passageway also having interposed therein, in serial relation to said cut-off valve device, the valve member 31 controlled by solenoid 30. Solenoid 30 and valve member 31 are arranged such that when said solenoid is energized, said valve member occupies an exhaust position in which it is shown in FIG. 2 and in which communication through passageway 38 is interrupted and chamber 32 is vented to atmosphere via an atmosphere vent 39. Deenergization of solenoid 30 effects operation of valve member 31 to a supply position in which it is shown in FIG. 3 and in which exhaust via vent 39 is cut off and supply of fluid pressure is communicated to chamber 32 via passageway 38.

A relatively weak biasing spring 40 is disposed in chamber 32 and exerts sufficient force on unlocking position 22 to maintain said piston and push rod 24 in contact with locking member 21, said force, however, not being effective for dislodging said locking member out of its locked position without assistance of fluid pressure acting on the piston.

Also associated with the brake cylinder device are several electrical circuits, as shown in FIGS. 2 and 3, controlled by the triple contact switch member 34 which carries three equidistantly, axially spaced switch elements 41, 42, and 43 (see FIG. 3). The several aforementioned electrical circuits are comprised as follows: (1) a solenoid energizing circuit comprising conductors 44 and 45 connected to and for energizing the coil of solenoid 30; (2) emergency brake application indicating circuits comprising conductors 45 and 46, and 45 and 47, respectively, for indicating at two different stations that a full or emergency brake application is in effect on the corresponding vehicle on which the respective brake cylinder is mounted; (3) a feed valve circuit comprising conductors 48 and 49, whereby the biasing current controlling the feed valve may be interrupted; and (4) a train brake indicating circuit comprising conductors 50 and 51 for indicating the condition of full or emergency braking in effect throughout the entire length of a train.

In the rest position of switch member 34, in which it is shown in FIG. 2, all the aforementioned circuits are open except the feed valve circuit 48-49 which is closed for providing actuating current for the electrically controlled feed valve.

With the vehicle in motion and the brakes in a fully released disposition, the several parts of the brake cylinder device are in the relative positions in which they are shown in FIGS. 1 and 2 of the drawing. Chamber 15 is vented to atmosphere via pipe 36 and a vent (not shown) in the feed valve device (not shown). Release portion 13 is locked in its release position by locking member 21 and, thereon, spring 14 is under compression due to previous braking operation of the brake cylinder device, as will become evident hereinafter. With spring 14 compressed, application piston 12 is biased by return spring 17 against release portion 13.

In effecting a service brake application for retarding the vehicle, the operator causes the feed valve (not shown) connected to pipe 36, to be operated to a supply position in which fluid pressure is supplied to chamber 15 at a degree preselected by the operator. The feed valve, for example, may be an electrically operable device normally maintained by a biasing current in a closed position in which fluid pressure supply via pipe 36 is cut off. Depending on the degree of reduction of the biasing current, as effected by the operator, fluid pressure supply is effected to pipe 36 at a degree inversely proportional to said degree of reduction of biasing current.

Fluid pressure via pipe 36 is supplied to chamber 15 of the brake cylinder and, therefore, acts on application piston 12 for effecting a corresponding degree of service application, it being recalled that release piston 13, at this time, is locked and remains in its release position during service braking operation (at less than full service application) and, therefore, the service application is not affected by action of spring 14.

When fluid pressure supplied to chamber 15, however, reaches a degree sufficient for effecting a full service application, such pressure is sufficient for relieving the tension of spring 14 acting axially on locking member 21 through piston rod 19, therefore conditioning the locking member for subsequent operation thereof to its unlocking position, as will be presently explained.

Circuit 44-45 controlling energization of solenoid 30 and consequently operation of switch device 23, may have interposed therein a normally closed pressure switch (not shown) which operates to an open position in response to brake-applying pressure at the full service level, for opening said circuit and causing deenergization of solenoid 30 and, therefore, as above noted, resulting in operation of valve member 31 from its exhaust position to its supply position. Circuit 44-45 may also include a manually operable switch (not shown) by which the operator may open or close said circuit at will.

With valve member 31 in its supply position, fluid pressure is supplied to chamber 32 to act on unlocking piston 22 and push rod 24 to move locking member 21, which is now free of spring tension from spring 14, to its unlocking position, whereby switch member 34 is operated by the locking member to its indicating position, in which feed valve circuit 48-49 and, therefore, the biasing current therefor is interrupted to cause supply of maximum pressure, as above explained, and circuits 50-51, 45-46, and 45-47 are all closed indicating, as above noted, maximum braking is in effect. Once having been operated to its indicating position, switch member 34 remains in said indicating position until locking member 21 is restored to its locking position, as will presently be described.

With a full service brake application in effect and with locking member 21 in its disengaged or unlocking position relative to piston rod 19, the biasing action of spring 14 acting through release piston 13 accumulates with the force of fluid pressure acting on application piston 12. Under such conditions, should a substantial leak occur in pipe 36, or for some other reason maximum pressure could not be maintained therein, a corresponding drop of pressure occurs in chamber 15 to permit release piston 13 to move toward application piston 12 and, upon a sufficient drop of such pressure, eventually make contact therewith for keeping maximum braking in effect.

At the same time a corresponding pressure drop occurs in chamber 32 and upon attainment of a predetermined drop, spring 25 acts to bias locking member 21 downwardly until it comes to rest on piston rod 19, but unless release piston 13 assumes its full release position in which groove 19 would be aligned opposite the locking member, said locking member does not drop down sufficiently to allow triple switch member 34 to drop out of the indicating position. Since feed valve circuit 48-49, therefore, remains in an interrupted or open state, the feed valve (not shown) remains in its open position to permit available fluid pressure to flow to chamber 15. As pressure builds up in chamber 15, release piston 13 moves toward its release position while pressure continues to build up on application piston 12.

To release the service application after release piston 13 reaches its full release position, the operator closes circuit 44-45 to reinstate energizing current to electric valve device 23, whereupon valve member 31, as was above noted, is restored to its exhaust position to vent pressure from chamber 32 and permit locking member 21 to drop into groove 20 on piston rod 19. As a result, triple switch member 34 is restored to its rest position, in which, among other functions, feed valve circuit 48-49 is closed to effect energization of the feed valve device which, as was above noted, cuts off further supply of fluid pressure to pipe 36 and chamber 15, the pressure in said chamber being vented to atmosphere.

If during brake release operation pressure does not build up sufficiently in chamber 15 to move release piston 13 to a full release position in which locking member 21 may engage groove 20, said piston may be manually operated to said full release position by the means (not shown) connectable to the end 33 of piston rod 19 or by a manually operable adjusting member 52 operably connected to the automatic slack adjuster 18.

It should be understood that variations of the invention, as disclosed, are possible without departing from the spirit thereof. For example, chamber 15 could be divided into two isolated chambers for serving application piston 12 and release piston 13 independently of each other. However, having release piston 13 acting directly on application piston 12 constitutes the simplest arrangement for transferring the braking force of spring 14 to the service application piston and rod 53.

It should be further understood that the respective pressure areas of application piston 12 and release piston 13 may be varied relative to each other. For example, pistons 12 and 13 could be similar to diameter and, therefore, the casing 10 could be bored at a uniform diameter. Or, as shown in FIG. 1, since pressure area of release piston 13 is greater than that of application piston 12, it is possible to effect locking of said release piston at a pressure less than that necessary for attaining a full service application, so that the force of spring 14 available fo emergency braking is at least equal to or slightly higher than the force generated for the full service application.

Having now described the invention, what I claim as new and desire to secure by Letters Patent, is:

1. A brake cylinder device for railway type vehicle brakes, said brake cylinder device comprising:
   a. a casing;
   b. a release piston reciprocably disposed in said casing;
   c. a piston rod connected to said release piston;
   d. force generating means acting on and biasing said release piston for exerting an emergency brake-applying force in one direction;
   e. second piston means reciprocably disposed in said casing in axially aligned and oppositely facing relation to and abuttingly engageable by said release piston for transmitting said emergency brake-applying force in said one direction;
   f. said release piston and said second piston means cooperating with said casing to form therebetween a pressure chamber subjectable to variable fluid pressure acting on opposing pressure areas of said release piston and said second piston means, respectively, for moving said release piston in a direction opposite to said one direction in counteraction to said emergency brake-applying force and for exerting a service brake-applying force in said one direction through said second piston means according to the resultant differential between the two braking forces;

g. a locking member pivotally disposed in said casing in transverse relation to said piston rod and biasingly engageable, upon movement of said release piston to a release position in a direction opposite to said one direction in response to fluid pressure in said pressure chamber at a certain high degree, with a groove formed in said piston rod for locking said release piston and piston rod against axial movement in a locked position coinciding with said release position and in which said emergency brake-applying force is neutralized during service brake-applying action effected by fluid pressure at a degree less than said certain high degree; and h. unlocking means operable responsively to subsequent restoration of fluid pressure to said certain high degree for causing operation of said locking member to an unlocking position in which said release piston is freed for exerting said emergency brake-applying force.

2. A brake cylinder device, as set forth in claim 1, further characterized by manually operable means for securing said locking member in its said locking position and, therefore, said release piston in its said release position.

3. A brake cylinder device, as set forth in claim 1, wherein the pressure area of said release piston is greater than the pressure area of said second piston means.

4. A brake cylinder device, as set forth in claim 1, further characterized by means for manually operating said unlocking member to its said unlocking position independently of said unlocking means.

5. A brake cylinder device, as set forth in claim 1, further characterized by an electrical switch member and an electrical circuit connected thereto, said switch member being operably connected to said locking member and operable thereby for controlling supply and release of fluid pressure to and from, respectively, said pressure chamber.

6. A brake cylinder device, as set forth in claim 1, wherein said unlocking means comprises:

a. an unlocking piston connected to said locking member and operable, in response to fluid pressure, for effecting operation of said locking member to an unlocking position in which said release piston and piston rod are free to move axially;

b. a valve member interposed in a fluid pressure supply passage, said valve member having a supply position, in which fluid pressure may be supplied to said unlocking piston, and an exhaust position in which said unlocking piston is relieved of fluid pressure acting thereon; and c. electrically operable means effective when deenergized for operating said valve member to its said supply position, and when energized for operating said valve member to its said exhaust position.

7. A brake cylinder device, as set forth in claim 6, further characterized by passage means for communicating the same fluid pressure to said unlocking piston as that supplied to said pressure chamber through said supply passage.

8. A brake cylinder device, as set forth in claim 1, further characterized by electrical means comprising an electrical switch member and electrical circuit connected thereto, said electrical switch member being operably connected to said locking member and operable thereby for opening or closing said circuits for indicating the position of the locking member.

9. A brake cylinder device, as set forth in claim 8, wherein said first and second piston means, said locking means, said unlocking means, and said electrical switch member and circuits are all housed in a common casing with an access cove member providing access to the locking and unlocking means to the electrical switch member and circuits.

10. A brake cylinder device, as set forth in claim 9, wherein said locking means, said unlocking means, and said electrical means are all disposed in a substantially common plane transversely to the axis of and adjacent one end of said casing to which said access cover member is secured.

* * * * *

UNITED STATES PATENT AND TRADEMARK OFFICE
CERTIFICATE OF CORRECTION

PATENT NO. : 4,014,579
DATED : March 29, 1977
INVENTOR(S) : Claude Jacque Dubois It is certified that error appears in the above-identified patent and that said Letters Patent are hereby corrected as shown below:

Column 8, line 25, "circuit" should be --circuits-- line 34, "cove" should be --cover--

Signed and Sealed this

Thirteenth Day of December 1977

[SEAL]

Attest:

RUTH C. MASON
Attesting Officer

LUTRELLE F. PARKER
Acting Commissioner of Patents and Trademarks